United States Patent
Soriaga et al.

(10) Patent No.: US 8,537,875 B2
(45) Date of Patent: Sep. 17, 2013

(54) METHODS AND APPARATUS FOR ADJUSTING FORWARD LINK SIGNAL TO INTERFERENCE AND NOISE RATIO ESTIMATES

(75) Inventors: Joseph B. Soriaga, San Diego, CA (US); Mingxi Fan, Beijing (CN); John Edward Smee, San Diego, CA (US); Jinghu Chen, San Diego, CA (US); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 13/086,564

(22) Filed: Apr. 14, 2011

(65) Prior Publication Data

US 2012/0263164 A1    Oct. 18, 2012

(51) Int. Cl.
     *H04B 1/00*      (2006.01)
(52) U.S. Cl.
     USPC ............................................. 375/130
(58) Field of Classification Search
     USPC ......... 370/310, 315, 316, 317, 318; 379/414, 379/416; 375/130, 140, 144, 147, 141, 148
     See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 6,574,211 B2 | 6/2003 | Padovani et al. | |
| 6,985,453 B2 | 1/2006 | Lundby et al. | |
| 7,106,792 B2 | 9/2006 | Corbaton et al. | |
| 7,206,598 B2 * | 4/2007 | Attar et al. | 455/522 |
| 7,228,148 B2 | 6/2007 | Esteves et al. | |
| 7,327,706 B2 | 2/2008 | Joshi et al. | |
| 7,369,549 B2 | 5/2008 | Wu et al. | |
| 7,596,090 B2 | 9/2009 | Black | |
| 7,623,553 B2 | 11/2009 | Bhushan et al. | |
| 7,738,906 B2 * | 6/2010 | Attar et al. | 455/522 |
| 2003/0054773 A1 | 3/2003 | Vanghi | |
| 2004/0198404 A1 | 10/2004 | Attar et al. | |
| 2005/0020295 A1 * | 1/2005 | Attar et al. | 455/522 |
| 2006/0030352 A1 | 2/2006 | Kiran et al. | |
| 2007/0127407 A1 * | 6/2007 | Attar et al. | 370/318 |
| 2008/0159196 A1 * | 7/2008 | Roh et al. | 370/311 |
| 2008/0194284 A1 | 8/2008 | Choi et al. | |

(Continued)

OTHER PUBLICATIONS

International Search Report and Written Opinion—PCT/US2012/033394—ISA/EPO—Jun. 11, 2012.

(Continued)

*Primary Examiner* — Fan Ng
(74) *Attorney, Agent, or Firm* — Rupit M. Patel

(57) ABSTRACT

Methods and systems for adjusting a forward link (FL) signal to interference and noise ratio (SINR) are provided. In an example, a FL SINR is estimated for each user in a plurality of users, on at least one of each user's respective data rate control (DRC) message or each user's respective prior FL SINR value. The respective estimated FL SINR for a user in the plurality of users is increased, if, based on a reverse link acknowledge message, the user has decoded a packet before all symbols in the packet have been transmitted. Remaining control channel power is determined. The estimated FL SINR for all users in the plurality of users is increased if remaining control channel power is less than a low threshold. The estimated FL SINR for all users in the plurality of users is increased if the remaining control channel power is greater than a high threshold.

38 Claims, 7 Drawing Sheets

(56) References Cited

U.S. PATENT DOCUMENTS

| | | | |
|---|---|---|---|
| 2010/0239048 A1* | 9/2010 | Lee et al. | 375/297 |
| 2010/0254292 A1* | 10/2010 | Kim et al. | 370/311 |
| 2011/0211623 A1* | 9/2011 | Kanellakopoulos et al. | 375/222 |
| 2011/0275404 A1* | 11/2011 | Ding et al. | 455/522 |
| 2012/0263164 A1* | 10/2012 | Soriaga et al. | 370/345 |

OTHER PUBLICATIONS

TIA/EIA/IS-856 Interim Standard, cdma2000 High Rate Packet Data Air interface Specification. Nov. 2000.

* cited by examiner

METHODS AND APPARATUS FOR ADJUSTING FORWARD LINK SIGNAL TO INTERFERENCE AND NOISE RATIO ESTIMATES

BACKGROUND

1. Field

The present disclosure relates generally to electronics, and more specifically, but not exclusively, to methods and apparatus for adjusting an estimated forward link signal to interference and noise ratio.

2. Background

A modern wireless communication system is required to support a variety of applications and allow multiple users to share a common communications medium. Numerous multiple-access techniques are known in the art, such as Code Division Multiple Access (CDMA). The multi-access concept is based on channel allocation that separates communications among multiple users. By way of example, in a CDMA communication system, channel separation can be achieved by transmitting each signal with a different code that modulates a carrier, and thereby spreads the signal over the entire frequency spectrum. A receiver separates the transmitted signals with a demodulator using a corresponding code to de-spread the desired signal. The undesired signals, whose codes do not match, contribute only to noise.

Using CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," issued Feb. 3, 1990, as well as in U.S. Pat. No. 5,103,459, entitled "SYSTEM AND METHOD FOR GENERATING WAVEFORMS IN A CDMA CELLULAR TELEPHONE SYSTEM," issued Apr. 7, 1992. Another CDMA system is disclosed in U.S. Pat. No. 6,574,211, entitled "METHOD AND APPARATUS FOR HIGH RATE PACKET DATA TRANSMISSION," issued Jun. 3, 2003 (the HDR system). These patents are incorporated herein by reference in their entireties.

A CDMA communications system is typically designed to conform to one or more standards. Such standards include the TIA-856 High Rate Data Air Interface Specification issued by the Telecommunications Industry Association (TIA), which is also known as the "cdma2000 1xEV-DO standard." The TIA-856 standard is incorporated herein by reference in its entirety.

In EV-DO compatible systems, a basestation (i.e., access point) distributes forward link (FL) control channel power among users (i.e., access terminals), so that each user's service meets a minimum performance requirement. To efficiently distribute the control channel power, the basestation needs information about the FL's signal to interference and noise ratio (SINR) for each user in order for conventional algorithms to allocate just enough power to maintain a target control channel SINR.

However, in conventional EV-DO systems, the basestation does not explicitly receive FL SINR information from the user. Instead, the basestation receives a data rate control (DRC) message, which is a FL data rate request generated by a rate predictor algorithm at the access terminal. The rate predictor requests data rates at which a target packet error rate (PER) can be maintained from a discrete list, based on then-current channel conditions. Thus, in conventional systems, the basestation only maps a discrete DRC data rate to a very coarse estimate of FL SINR. Generally, the FL SINR estimated by a DRC mapping is lower than the actual FL SINR. This bias is especially noticeable for voice over IP (VOIP) data on 1xEV-DO Rev. A/B systems because it is recommended that DRC length for these systems be 8 slots (equivalently, 8*1.67 ms=13.36 ms) to reduce overhead gain on a reverse link (RL). In this case, the FL SINR estimated from the DRC message can be as much as 10 dB lower than the FL SINR estimated at the access terminal, whenever the user is not stationary. On the other hand, for stationary users this bias is within 3 dB. The worst case bias occurs on slow-fading channels. Similar statistics have been seen in system simulations using the Third Generation Partnership Project 2 (3GPP2) methodology.

As a result of the conservative nature of the FL SINR estimate, power is inefficiently allocated. In the case of users with VOIP traffic, the resulting inefficiency limits user capacity of networks having reverse-link interference cancellation (IC) enabled at the basestation. Accordingly, there are long-felt industry needs for methods and apparatus to adjust the FL SINR estimates in order to improve performance of wireless communication systems.

SUMMARY

Exemplary embodiments of the invention are directed to methods and apparatus for adjusting an estimate of a forward link signal to interference and noise ratio.

In an example, a method of adjusting a plurality of forward link (FL) signal to interference and noise ratio (SINR) estimates is provided. The method includes receiving a data rate control (DRC) message from each user in the plurality of users. Prior respective FL SINR values associated with each user can be filtered. A FL SINR for each user in a plurality of users is estimated, based on at least one of each user's respective data rate control (DRC) message or each user's respective prior FL SINR value. The estimating can be performed in a first time slot, where the subsequent steps are performed in a subsequent second time slot. The respective estimated FL SINR for a user in the plurality of users are increased, if, based on a reverse link acknowledge message, the user has decoded a packet before all symbols in the packet are transmitted. Then, remaining control channel power is determined. If the remaining control channel power is less than a low threshold, the estimated FL SINR for all users in the plurality of users is increased. The increase can be limited to a maximum increase limit, and the estimated FL SINR for a first user can be increased by a larger amount than the increase amount for a second user, if the first user's DRC message is longer than the second user's DRC message. If the remaining control channel power is greater than a high threshold, the estimated FL SINR for all users in the plurality of users is decreased. The decrease can be limited to a maximum decrease limit, and the estimated FL SINR for a first user can be decreased by a larger amount than the decrease amount for a second user, if the first user's DRC message is longer than the second user's DRC message. The process can be repeated until the remaining control channel power is between the high and low thresholds.

In a further example, provided is a non-transitory processor-readable medium, comprising instructions that, if executed by a processor, cause the processor to perform at least a part of the methods described hereby.

In another example, provided is an apparatus for adjusting a plurality of FL SINR estimates. The apparatus includes a transceiver configured to support a plurality of communication links with a respective plurality of user access terminals and a processor coupled to the transceiver. A memory is coupled to the processor. The memory comprises executable code to cause the processor to perform at least a part of the methods described hereby.

BRIEF DESCRIPTION OF THE DRAWINGS

The accompanying drawings are presented to aid in the description of embodiments of the invention, and are provided solely for illustration of the embodiments and not limitation thereof.

In accordance with common practice, some of the drawings are simplified for clarity. Thus, the drawings may not depict all of the components of a given apparatus (e.g., device) or method. Finally, like reference numerals are used to denote like features throughout the specification and figures.

DETAILED DESCRIPTION

Figure 1:
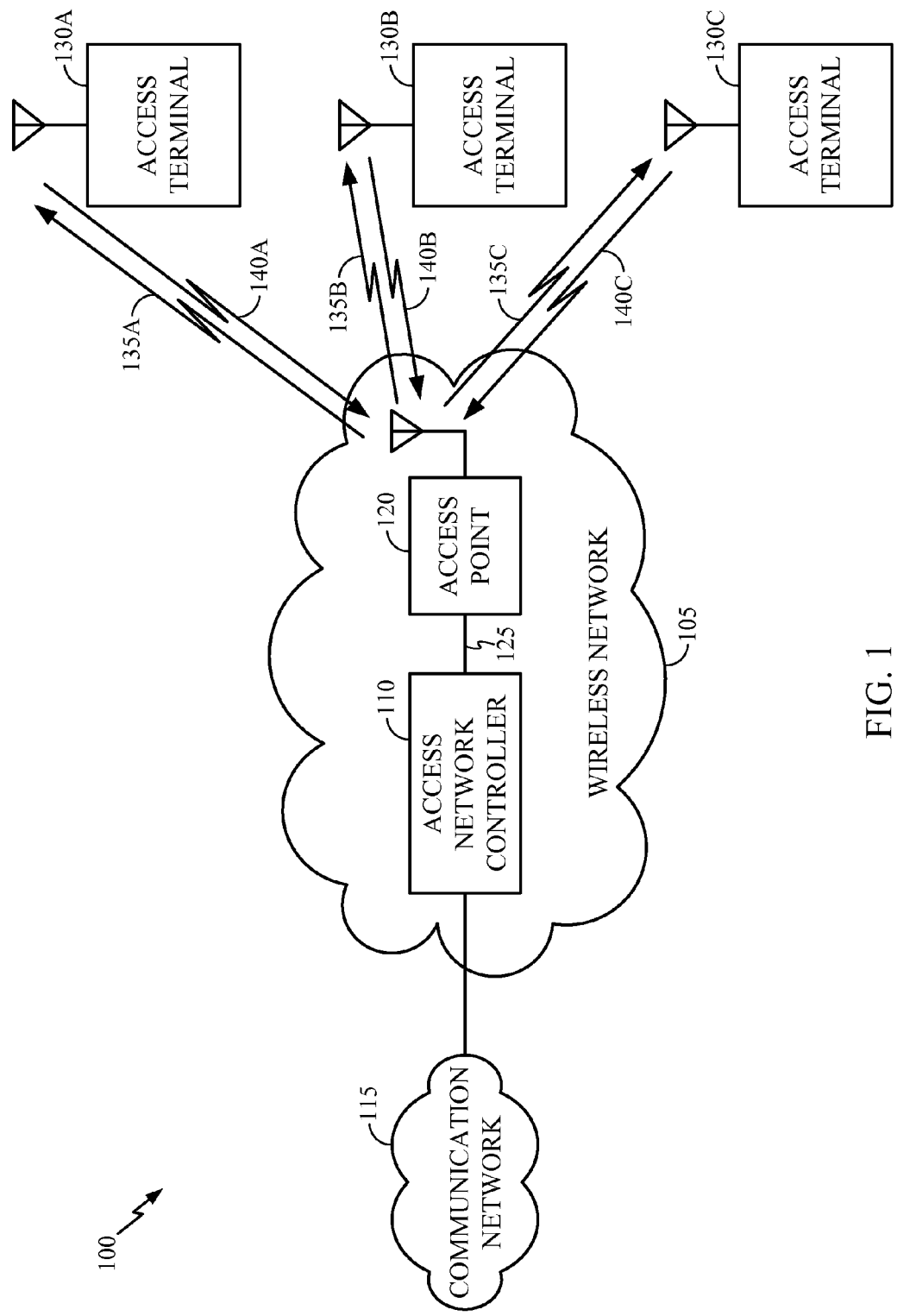
FIG. 1 is a block diagram illustrating an exemplary EV-DO system.

Aspects of the invention are disclosed in the following description and related drawings directed to specific embodiments of the invention. Alternate embodiments can be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

It should be noted that the terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As employed herein two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

The term "signal" can include any signal such as, for example, a data signal, audio signal, video signal, and/or a multimedia signal.

Information and signals can be represented herein using any of a variety of different technologies and techniques. For example, data, instructions, commands, information, signals, bits, symbols, and chips that can be referenced throughout this description can be represented by voltages, currents, electromagnetic waves, magnetic fields or particles, optical fields, or any combination thereof.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed, or that the first element must precede the second element in some manner. Also, unless stated otherwise, a set of elements can comprise one or more elements. In addition, terminology of the form "at least one of: A, B, or C" used in the description or the claims means "A or B or C or any combination of these elements."

The terminology used herein is for the purpose of describing particular embodiments only, and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In a cdma2000 1xEV-DO compatible system (EV-DO system), wireless communication entities can be conceptually simplified to an access terminal (AT) and an access point (AP). The AT is any device that allows a user to access a packet-switched data network through the EV-DO system. The AP is any network equipment/entity providing data connectivity between a data packet-compatible network and the AT. The AP is analogous to a basestation, such as that found in a cellular communication system, thus, cellular communication terminology is often used to describe details of the EV-DO system.

Methods and apparatus are described hereby in the context of the EV-DO system and EV-DO compatible devices. While these methods and apparatus are well-suited for an EV-DO application, those skilled in the art will readily appreciate that these inventive aspects are likewise applicable in various other communication and/or electronic devices. Accordingly, any reference to a CDMA wireless communications device, an EV-DO system, or an EV-DO compatible device is intended only to illustrate the inventive aspects, with the understanding that such inventive aspects have a wide range of applications.

FIG. 1 is a block diagram illustrating an exemplary EV-DO system 100. The EV-DO system 100 includes a wireless network 105 having an access network controller 110. The access network controller 110 interfaces the wireless network 105 to a communications network 115. The communications network 115 can be a packet-compatible network, such as the Internet, a corporate intranet, or the like. Also, the communications network 115 can be a circuit-switched network, such as a public switched telephone network (PSTN).

The wireless network 105 can have any number of access points (AP) 120 dispersed throughout a geographic region. The geographic region can be subdivided into smaller regions known as cells with a respective AP 120 serving each cell. For simplicity, only one AP 120 is depicted in FIG. 1. The AP 120 serves an entire sector under control of the access network controller 110. The AP 120 is connected to the access network controller 110 over a backhaul 125.

In FIG. 1, three ATs 130A-C are shown in communication with the AP 120. Each of the ATs 130A-C can access the communications network 115 or communicate with other ATs 130A-C through one or more APs 120. The AP 120 transmits data to the ATs 130A-C over a respective forward link (FL) 135A-C, and receives data from the ATs 130A-C over a respective reverse link (RL) 140A-C. Data transmission on the FL 135A-C occurs from one AP 120 to one of the ATs 130A-C at, or near, the maximum data rate that can be supported by the respective FL 135A-C and the EV-DO system 100. Additional channels of the FL 135A-C, e.g., a control channel, can be transmitted from multiple APs 120 to one of the ATs 130A-C. Link data communication via the RL 140A-C can occur from one of the ATs 130A-C to one or more APs 120. For simplicity, the following description discusses operation of the AT 130A. The other ATs 130B-C operate in a similar manner.

When coupled, the AT 130A is able to communicate data and control messages with the AP 120, including data and control messages relating to power control. Power control allows the EV-DO system 100 to adapt to changing environmental conditions, including but not limited to geographical conditions and mobile velocity. As the changing environmental conditions impact communication link quality, the APs 120 transmission parameters adjust to accommodate the changes. This process is referred to as link adaptation. It is desirable for link adaptation to track the conditions of the system as accurately and quickly as possible.

Link adaptation is controlled at least in part by the communication link quality. For example, when coupled to an AP 120, the AT 130A calculates a quality metric of the associated FL 135A, comprising an estimated FL signal-to-interference-and-noise ratio (SINR), for example, based upon a measured FL SINR and historical FL SINR measurements. In an example, the AT 130A estimates the FL SINR by measuring a pilot signal that is modulated in a predetermined manner and received from the AP 120. The AT 130A measures the received pilot SINR and predicts the estimated SINR of the FL 135A from the measurement. The estimated FL SINR is a factor used by the AT 130A in preparing a data rate control (DRC) message.

The DRC message includes a DRC index that the AT 130A transmits to the AP 120. The DRC index corresponds to the rate at which the AT 130A expects to receive data on the FL 135A. The DRC index depends, at least in part, on the FL SINR measured by the AT 130A. Less noisy channels can support higher data rates, and lead to a higher DRC index. The DRC index should therefore be decreased as the FL SINR decreases, or increased as the FL SINR increases. The DRC index should be set as high as possible if data throughput in the system is to be maximized.

The AT 130A selects a DRC index with the highest data rate that can be supported by the FL 135A, based on the estimated FL SINR for a certain error performance (e.g., packet error rate (PER)). The AT 130A determines an optimum data rate for each of the measured FL SINR values, such as through a mapping function. The mapping function can be performed with a look-up table, an algorithm, or by other means. An exemplary look-up table for mapping the measured FL SINR to a data transmission rate that achieves a certain PER is shown below in Table 1.

TABLE 1

| Rate (bps) | DRC index | Packet Length (slot) | SINR Threshold (dB) |
|---|---|---|---|
| 2.456M | 12 | 1 | 10.3 |
| 1.843M | 11 | 1 | 8.0 |
| 1.228M | 10 | 2 | 4.0 |
| 1.228M | 9 | 1 | 3.9 |
| 921.6K | 8 | 2 | 2.2 |
| 614.4k | 7 | 2 | −0.6 |
| 614.4k | 6 | 1 | −0.5 |
| 307.2k | 5 | 4 | −3.5 |
| 307.2k | 4 | 2 | −3.5 |
| 153.6k | 3 | 4 | −6.5 |
| 76.8k | 2 | 8 | −9.2 |
| 38.4k | 1 | 16 | −11.5 |

Referring to Table 1, the selected data rate for a FL SINR value is the highest data rate among those whose thresholds are lower than the measured FL SINR value. By way of example, a measured FL SINR value of 2.2 dB for a 2-slot transmission should result in the selection of a 921.6 kbps data rate. If this measured FL SINR value yields the highest data rate among the various measured FL SINR values, then the corresponding DRC index (i.e., DRC index 8) is selected by the AT 130A.

After measuring the FL SINR, the AT 130A broadcasts a DRC message on a data request channel (DRC channel) to the AP 120. The DRC message includes the DRC index. The AP 120 receives the DRC message, and adjusts the FL SINR estimate as described in detail hereby.

The AP 120 uses the rate control information received in the DRC message from each of the ATs 130A-C to efficiently transmit data over the FL 135A at the highest possible rate. Because the rate of data can vary, the communication system operates in a variable rate mode. The AP 120 determines the data rate at which to transmit the data packet to the AT 130A based on the most recent value of the DRC message received from the AT 130A and the adjusted FL SINR estimate.

Average signal transmission power of the AP 120 can be controlled at a transmitter to achieve a specific FL SINR at the AT's receiver, in accordance with quality of service (QoS) requirements. Typically, a higher FL SINR is required to achieve a higher data rate for a video or other high-bandwidth transmission. A higher FL SINR can also be required if the AP 120 is far away from the AT 130A. In either case, improvements in the FL SINR can be achieved by increasing the average signal transmit power at the AP's 120 transmitter. An exemplary method for power allocation to reverse power control (RPC) channels is described in U.S. patent application Ser. No. 10/263,976, entitled "POWER ALLOCATION FOR POWER CONTROL BITS IN CELLULAR NETWORK," filed Oct. 2, 2002, assigned to the present assignee.

When a data packet is to be transmitted to the AT 130A, the data packet arrives at the access network controller 110. Thereafter, the access network controller 110 sends the data packet to the AP 120 over the backhaul 125. The AP 120 can schedule data transmissions to any of the ATs 130A-C at each interval of the FL 135A. The AT 130A, for which the data packet is intended, receives and decodes the data packet. Each data packet is associated with an identifier, e.g., a sequence number, which is used by the AT 130A to detect either missed or duplicate transmissions. Missed transmissions can be caused by, e.g., the AT 130A moving from a coverage area of the AP 120, shadowing, fading, and other well known reasons. In such an event, the AT 130A communicates sequence numbers of the missing data packets via the RL 140A. The access network controller 110 receives the data packet from the AT 130A via the AP 120 communicating with the AT 130A, then indicates to the AP 120 which data packets were not received by the AT 130A. The AP 120 then schedules a re-transmission of such data packets.

Figure 2:
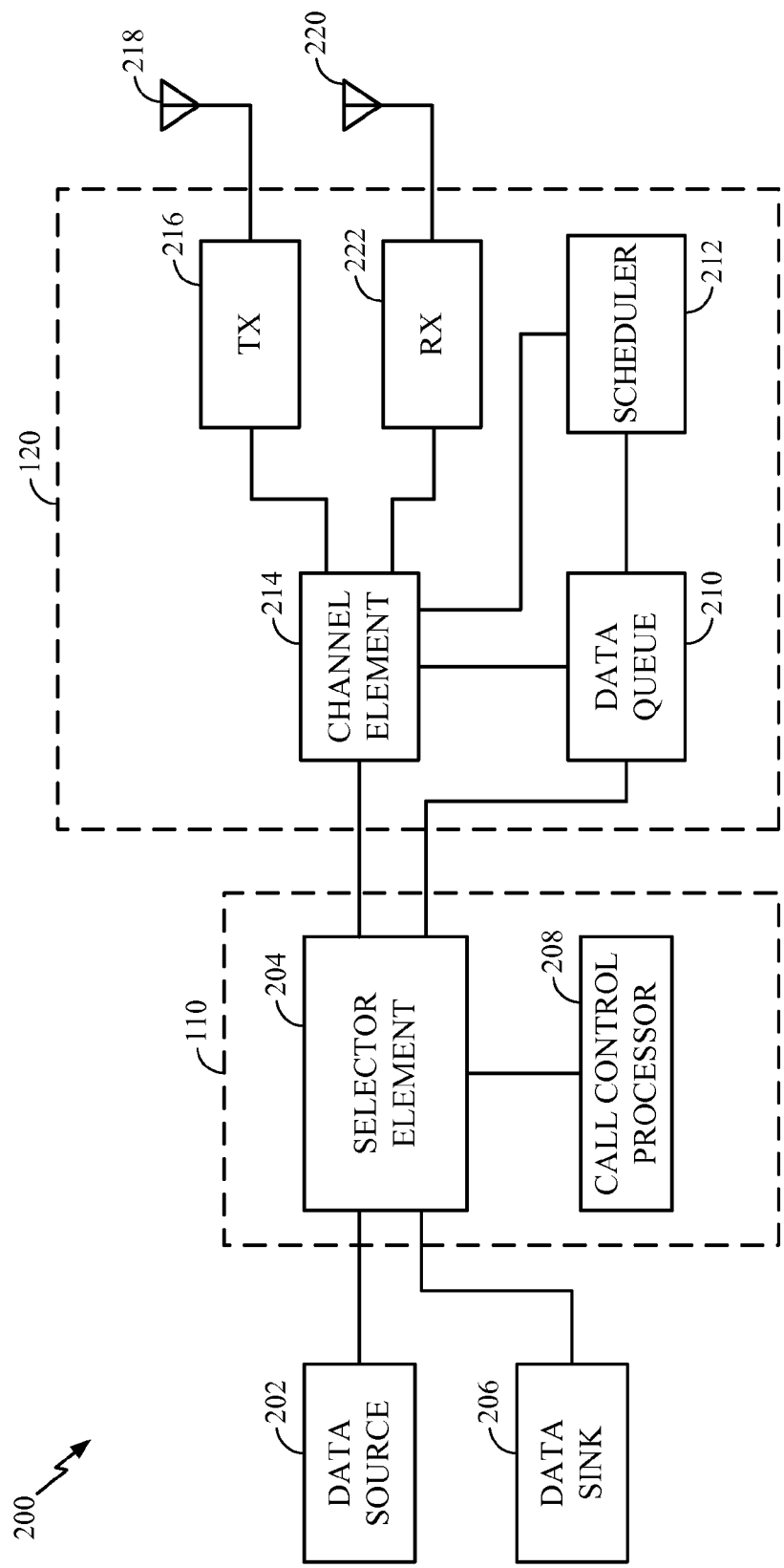
FIG. 2 depicts an exemplary block diagram of an access network controller and an access point.

FIG. 2 depicts an exemplary block diagram 200 of the access network controller 110 and the AP 120 in further detail. User data generated by a data source 204 is provided to the access network controller 110. The access network controller 110 interfaces with the AP 120, forming the wireless network 105. The user data is provided by the data source 202 to a selector element 204. The selector element 204 controls user data exchange between the data source 202, a data sink 206, and one or more APs 120 under the control of a call control processor 208. The call control processor 208 can comprise, e.g., a processor and a storage medium coupled with the processor and containing a set of instructions executable by the processor. As illustrated in FIG. 2, the selector element 204 provides the user data to a data queue 210, which queues the user data to be transmitted to the ATs 130A-C served by the AP 120. Under control of a scheduler 212, the user data is provided by the data queue 210 to a channel element 214. The channel element 214 processes the data packet in accordance with the IS-856 standard and adjusts the estimated FL SINR. The channel element 214 provides the processed data to a transmitter 216. The transmitter 216 transmits the data packet over the respective FL 135A-C via a transmit antenna 218.

A receive antenna 220 receives signals from the ATs 130A-C via their respective RL 140A-C, and provides the received signals to a receiver 222. The receiver 222 filters, amplifies, demodulates, and digitizes the signal. The receiver 222 provides the digitized signal to the channel element 214. The channel element 214 performs the inverse of the signal processing functions performed at the AT 130A, and provides the decoded data to the selector element 204. The selector element 204 routes the user data to the data sink 206 and the overhead data to the call control processor 208. In an example, the transmit antenna 218 and the receive antenna 220 are the same antenna.

Figure 3:
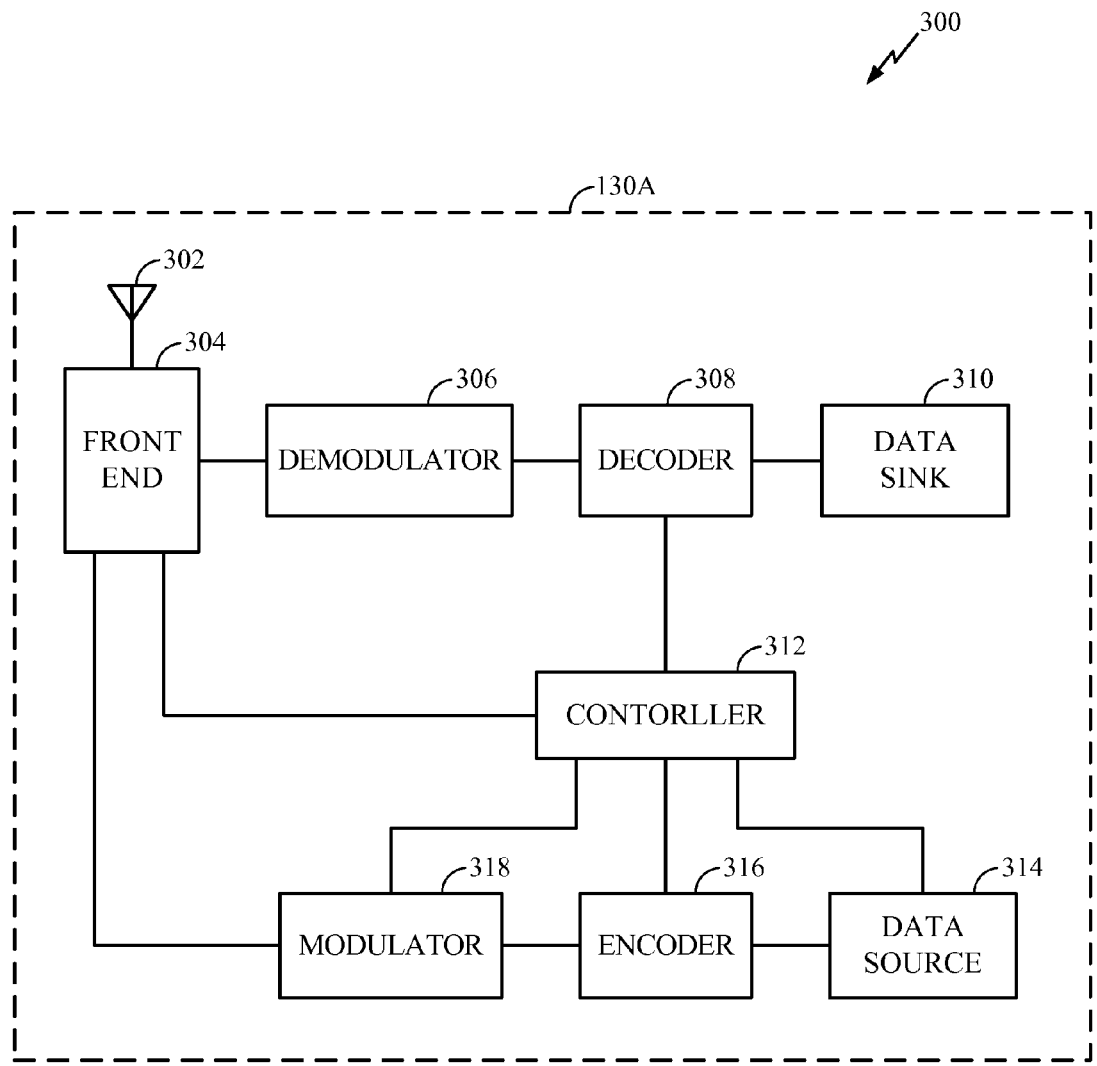
FIG. 3 depicts an exemplary block diagram of an access terminal.

FIG. 3 depicts an exemplary block diagram 300 of the AT 130A in further detail. Signals from the FL 135A are received by an access terminal antenna 302 and routed to a front end 304, which includes a receiver. The receiver filters, amplifies, demodulates, and digitizes the signal provided by the access terminal antenna 302. The digitized signal is provided to a demodulator 306, which provides demodulated data to a decoder 308. The decoder 308 performs an inverse of the signal processing functions performed by the AP 120, and provides decoded user data to a data sink 310. The decoder 308 communicates with a controller 312, providing overhead data to the controller 312. The controller 312 communicates with other circuits in the AT 130A to provide proper control of AT's 130A operation, such as data encoding and power control. The controller 312 can include, for example, a processor and a storage medium coupled to the processor and containing a set of instructions that are executable by the processor.

The data packets to be transmitted to the AP 120 from the AT 130A are provided from a data source 314 under the direction of the controller 312 via an encoder 316. The controller 312 provides overhead data to the encoder 316. The encoder 316 encodes the data and provides the encoded data to a modulator 318. The processed data is then provided to a transmitter within the front end 304. The transmitter filters, amplifies, and transmits the data to the AP 120, via antenna 302 and RL 140A.

Figure 4:
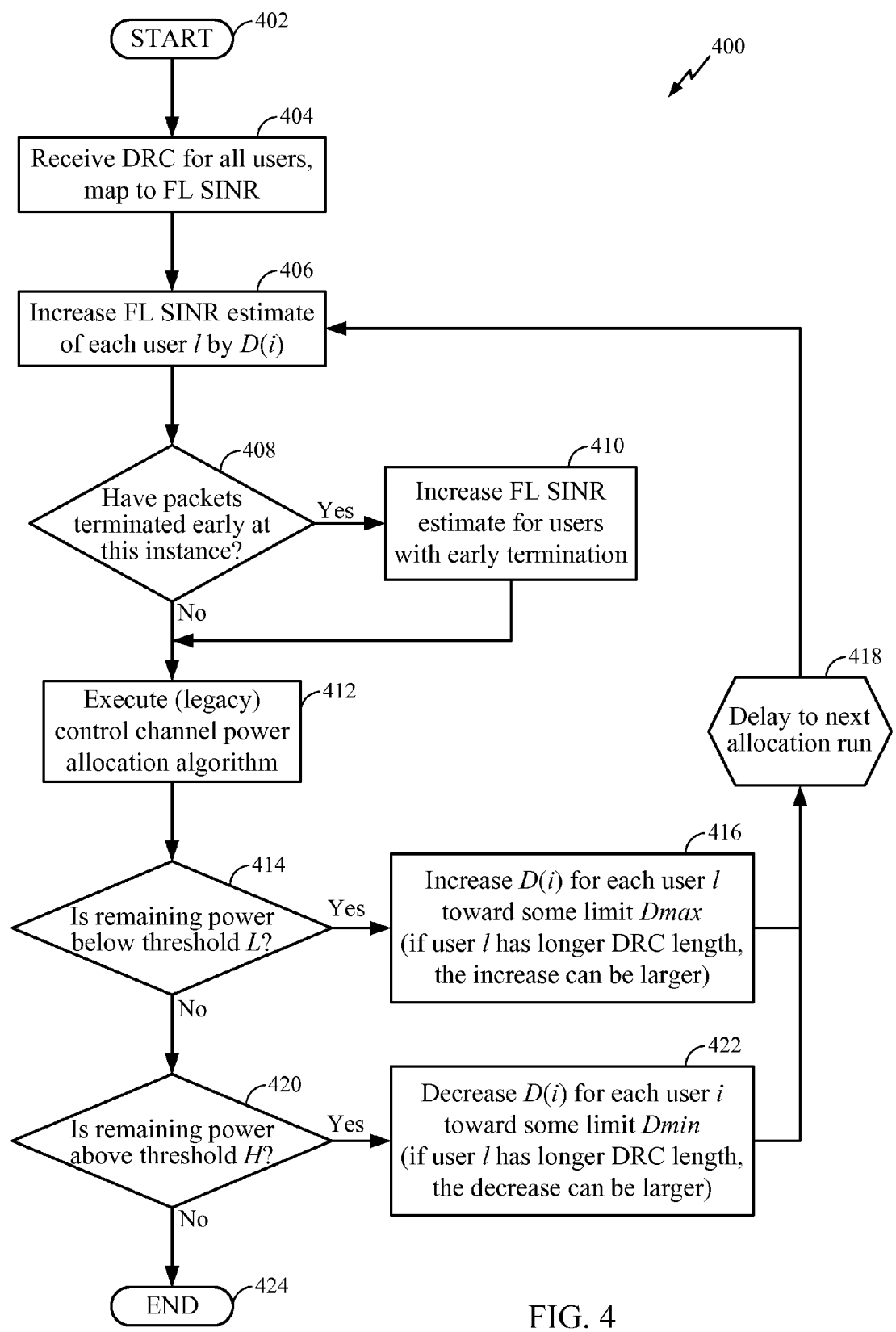
FIG. 4 depicts a flowchart of an exemplary method of adjusting a plurality of FL SINR estimates.

FIG. 4 depicts a flowchart of an exemplary method of adjusting a plurality of FL SINR estimates 400.

In step 402, the method is started.

In step 404, a data rate control (DRC) message from each user in the plurality of users is received. Optionally, prior respective FL SINR values of each user can be filtered. Further, a FL SINR for each user in a plurality of users is estimated, based on at least one of each user's respective data rate control (DRC) message or each user's respective prior FL SINR value. The estimating can be performed in a first time slot, where the subsequent steps are performed in a subsequent second time slot.

In step 406, the FL SINR estimate for each user is increased by an amount specific to an individual user D(i). Initially, the increase amount D(i) is zero.

In step 408, a decision is made relating to early packet termination. If packets have terminated early during the current iteration of the process, then step 410 is executed. If packets have not terminated early during the current iteration of the process, then step 412 is executed.

In step 410, the respective estimated FL SINR for a user in the plurality of users are increased, if, based on a reverse link acknowledge message (RL_ACK), the user has decoded a packet before all symbols in the packet have been transmitted.

In step 412, the conventional control channel power algorithm is executed.

In step 414, remaining control channel power is determined and a decision is made. If the remaining power is below a low threshold, then step 416 is performed. If the remaining power is not below a low threshold, then step 420 is performed.

In step 416, the estimated FL SINR for all users in the plurality of users is increased by an amount D(i). The increase D(i) can be limited to a maximum increase limit, and the estimated FL SINR for a first user can be increased by a larger amount than the increase amount for a second user, if the first user's DRC message is longer than the second user's DRC message. Step 418 is performed after step 416.

In step 418, a time delay is executed. After step 418, the process repeats, starting at step 406. The process can be repeated until the remaining control channel power is between the high and low thresholds.

In step 420, a decision is made. If the remaining power is above a high threshold, then step 422 is performed. If the remaining power is not above a high threshold, then step 424 is performed.

In step 422, the estimated FL SINR for all users in the plurality of users is decreased. The decrease can be limited to a maximum decrease limit, and the estimated FL SINR for a first user can be decreased by a larger amount than the decrease amount for a second user, if the first user's DRC message is longer than the second user's DRC message. Step 418 is performed after step 422.

In step 424, the exemplary method of adjusting a plurality of FL SINR estimates ends.

The methods described hereby provide an improved power allocation algorithm based on improving the FL SINR estimation process. The AP 120 can use information about a user's early packet termination to refine FL SINR estimates. For highly loaded systems, the AP 120 can increase the FL SINR estimates slightly, but uniformly, across all users as control channel power begins running out, effectively lowering the allocated power to all users and thus accommodating more users. Also, the adjustment of FL SINR can vary with DRC length, since shorter DRC lengths improve FL SINR estimates. By improving the conventional power allocation algorithm, control channel performance (and higher network capacity) is achieved. These improvements are detailed in turn below.

The FL SINR estimate can be adjusted based on early packet termination. Whenever a user's packet from the FL 135A decodes early (i.e., before all symbols in the packet have been transmitted), the AT 130A can signal the AP 120 to early terminate transmission by sending the RL_ACK signal on the RL 140A. However, since the DRC values from the AT 130A reflect sustainable rates for the full packet duration, early termination implies that the true FL SINR, over the span of the transmitted portion, exceeds the FL SINR estimated by the AT 130A (and correspondingly, the FL SINR estimated at the AP 120). Therefore, the FL SINR estimate can be increased. For example, the FL SINR estimate can be increased by a ratio of nominal packet length to early-terminated packet length. In another example, the FL SINR estimate can be increased based upon an error exponent analysis of the coded modulation schemes being used and comparing the nominal packet length to the early termination packet length.

The FL SINR estimate can also be adjusted based on control channel power. Prior to adjustment, the FL SINR estimate is conservative. As the network becomes heavily loaded, this conservativeness leads to some users not receiving any control channel power (especially in legacy systems), while mobile users have more than they need. Therefore, in heavily loaded systems where remaining control channel power is below a certain threshold, the AP 120 can choose to increase the FL SINR estimate uniformly across all users, for example, by a small amount. This technique provides results that are equivalent to using an aggressive FL SINR inverse DRC mapping for all of the users.

Increasing the FL SINR estimate uniformly across all users does not hurt the control channel performance below desired levels for mobile users, since the mobile user's FL SINR bias is very large. Further, by making only small increases (e.g., ~1 dB) to the FL SINR estimate, power is saved throughout the network. For example, if the FL SINR estimate is increased for all users by ~1 dB, then the network power savings is approximately 20%, because control channel power scales inversely with the FL SINR. Moreover, by adjusting the FL SINR estimate when the control channel power is small, there is no loss in performance for lightly loaded systems, or systems having only stationary users with low FL SINR biases, which leads to efficient power allocation.

In addition, the FL SINR estimate can be adjusted as a function of DRC length. The FL SINR estimate cannot be updated frequently when the DRC length is larger, as can be the case for mobile users. Thus, the FL SINR biases can be larger for mobile users. For stationary users, the update interval can have a negligible effect on the FL SINR bias.

When FL SINR estimates are adjusted based on control channel power, the adjustment method can differentiate between users, based on DRC length. Thus, when the system becomes heavily loaded and begins running out of excess control channel power, the estimated FL SINRs are adjusted for users using longer DRC lengths, prior to adjusting FL SINR estimates for users using shorter DRC lengths. In another example, FL SINR estimates are adjusted in different increments, based on the DRC length.

The apparatus described hereby can perform at least a part of the method of adjusting a plurality of FL SINR estimates 400.

Figure 5:
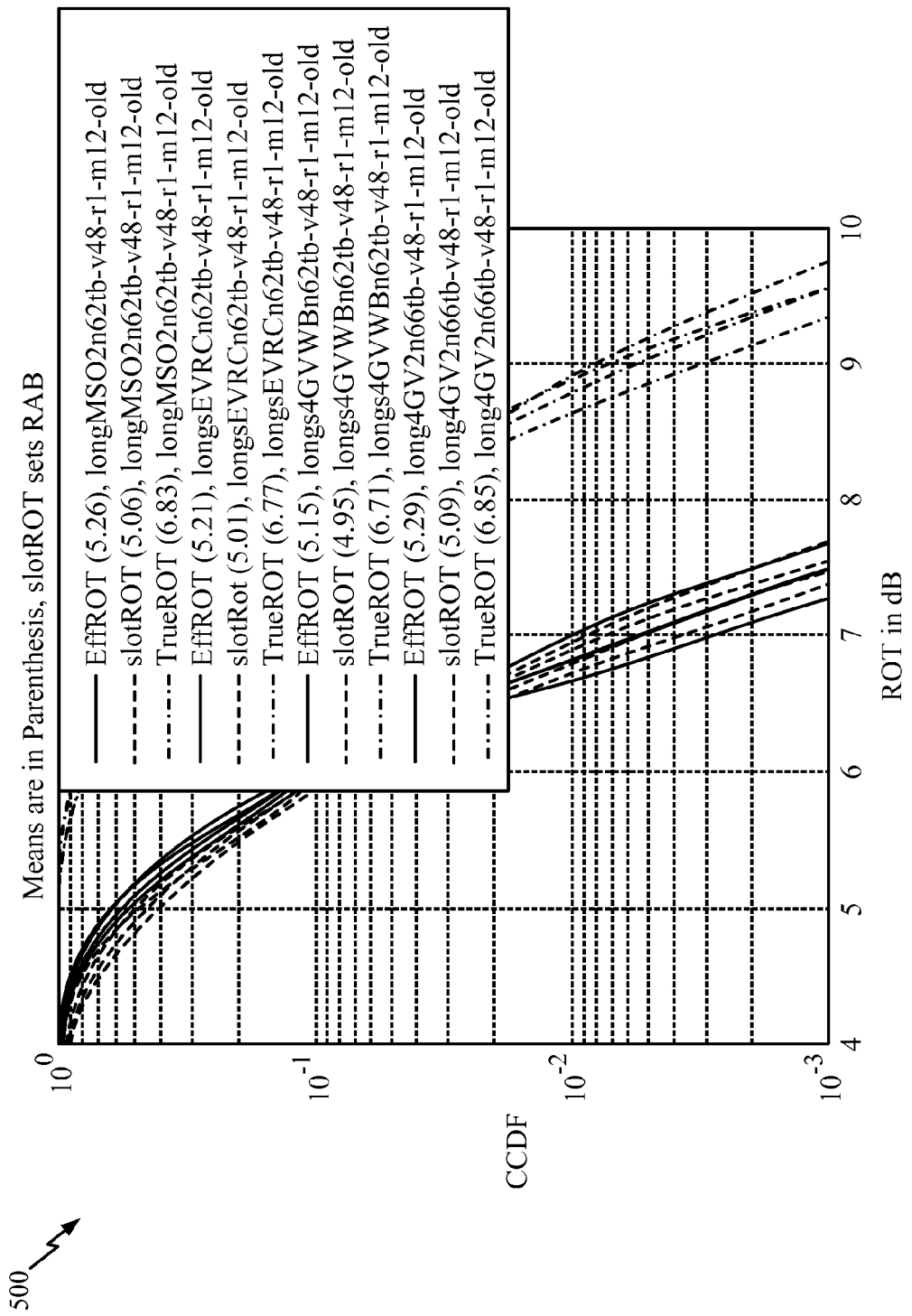
FIG. 5 depicts RoT for an exemplary network carrying VOIP traffic and using a conventional power allocation algorithm.
Figure 6:
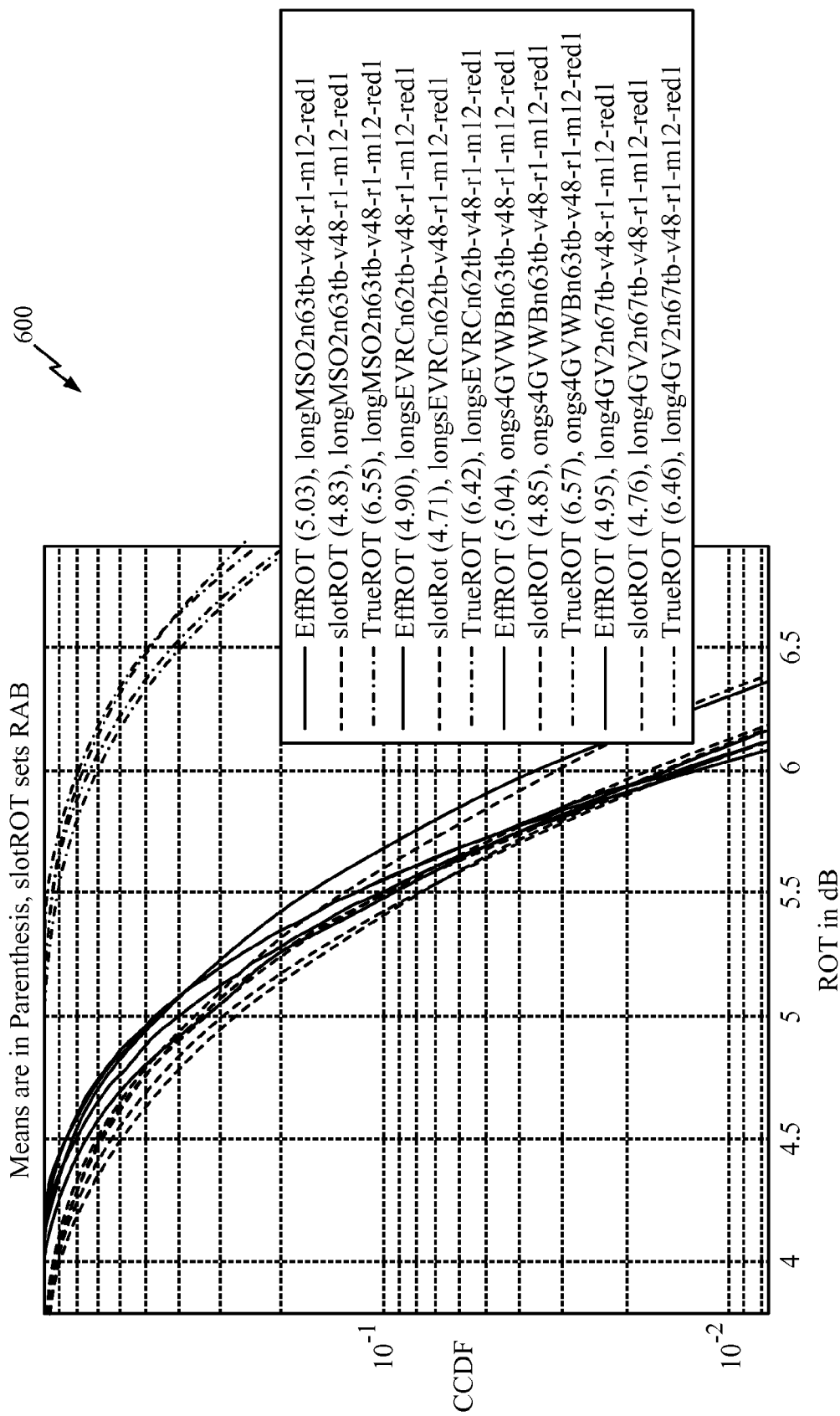
FIG. 6 depicts RoT for an exemplary network carrying VOIP traffic and implementing methods described hereby.
Figure 7:
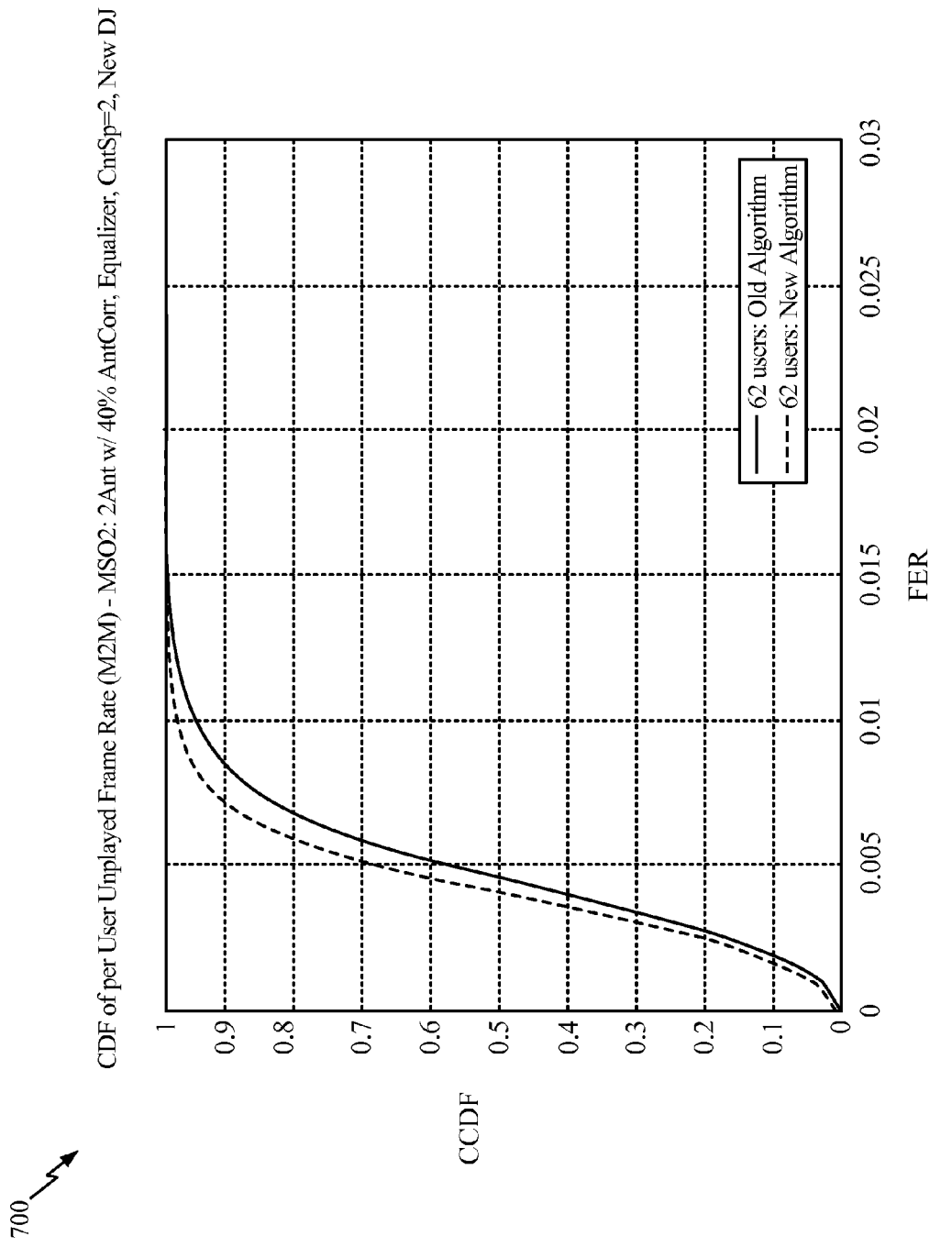
FIG. 7 depicts an exemplary end-to-end delay of packets resulting from implementing methods described hereby.

FIGS. 5-7 depict performance results from exemplary network simulations performed according to Third Generation Partnership Project 2 (3GPP2) methodology. In the simulations, 10% of users in a network are stationary, and remaining users are mobile at speeds ranging from 3 km/hr to 120 km/hr. Accordingly, control power allocation in these cases can be quite conservative and inefficient. When the network becomes significantly loaded, early packet termination on the RL 140A-C occurs less often as hybrid automated repeat request (HARQ) power becomes less available. Moreover, a reduction in the rate of early packet termination leads to a higher Rise-Over-Thermal (RoT), which ultimately limits network capacity.

FIG. 5 depicts the RoT 500 for a network carrying VOIP traffic and using a conventional power allocation algorithm, under four basic VOIP traffic source/vocoder models, i.e., abbreviated with MSO2, EVRC, 4GVWB, and 4GV2. In these cases we find that the 7 dB at 1% point on the complementary cumulative distribution function (CCDF), which is used to measure the capacity, is met when there are 62 users of type MSO, 63 users of type 4GVWB, 67 users of type 4GV2, or when there are 66 users of type 4GV2.

FIG. 6 depicts the RoT 600 for a network carrying VOIP traffic and implementing the methods described hereby. FIG. 6 shows improved hybrid automatic repeat request (HARQ) performance from more efficient allocation of power, and for nearly the same loading as the example shown in FIG. 6 (respectively, 63, 62, 63, and 67 users of type MSO2, EVRC, 4GVWB, 4GV2), the CCDF <7 dB at 1%. Thus, when implementing the methods described hereby, more users can be loaded onto the system until the RoT CCDF is 7 dB at 1%.

FIG. 7 depicts an end-to-end delay of packets 700 resulting from implementing the methods described hereby. FIG. 7 is based upon the same loading as in FIGS. 5-6. FIG. 7 shows an improvement in delay accompanying the lower RoT. At the 95% tail, the improvement in delay time is approximately 10 ms.

In these simulations, the value for the maximum increase limit (Dmax) was chosen to be 1 dB. For scenarios with fewer mobile VOIP users, or with only stationary VOIP users, the method described hereby will not make as many FL SINR adjustments because less power is inefficiently consumed due to the FL SINR bias. Moreover, this is also the case if there are more users with shorter DRC lengths. Thus, the high loading behavior of the methods described hereby provides an overall network capacity increase with little or no penalty in performance to stationary users, and for low loading, the algorithm maintains or exceeds performance targets for all types of users.

Further, embodiments are described in terms of actions to be performed by, for example, elements of a computing device. Various actions described hereby can be performed by specific circuits (e.g., an application specific integrated circuit (ASIC), a physical layer device), by program instructions being executed by one or more processors, or by a combination thereof. Additionally, the actions described hereby can be considered to be embodied entirely within any form of non-transient processor-readable storage medium having stored therein a corresponding set of instructions that upon execution cause an associated processor to perform the functionality described hereby. The embodiments described hereby can be embodied in a number of different forms, all of which have been contemplated to be within the scope of the claimed subject matter. In addition, for each of the embodiments described hereby, the corresponding form of any such embodiments can be described hereby as, for example, "logic configured to" perform the described action.

The disclosed apparatus and methods can be designed and can be configured into GDSII and GERBER computer files, and stored on a computer readable media, such as in a file form. These files are in turn provided to fabrication handlers who fabricate devices, based on these files, with a lithographic device. The resulting products are semiconductor wafers that are then cut into semiconductor dies and packaged into semiconductor chips. The chips are then employed in devices described hereby.

The methods disclosed hereby comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Nothing that has been stated or illustrated is intended to cause dedication of any component, step, feature, object, benefit, advantage, or equivalent to the public, regardless of whether it is recited in the claims.

While the foregoing disclosure shows illustrative embodiments of the invention, it should be noted that various changes and modifications could be made hereby without departing from the scope of the invention as defined by the appended claims.

What is claimed is:

1. A method of adjusting a plurality of forward link (FL) signal to interference and noise ratio (SINR) estimates, comprising:
    (a) estimating a FL SINR for each user in a plurality of users, based on at least one of each user's respective data rate control (DRC) message or each user's respective prior FL SINR value;
    (b) increasing the respective estimated FL SINR for a user in the plurality of users, if, based on a reverse link acknowledge message, the user has decoded an early-terminating packet at a decoding bit rate higher than a data rate associated with the user's respective DRC;
    (c) determining control channel power remaining after step (b);
    (d) increasing the estimated FL SINR for all users in the plurality of users if the remaining control channel power is less than a low threshold; and
    (e) decreasing the estimated FL SINR for all users in the plurality of users if the remaining control channel power is greater than a high threshold.

2. The method of claim 1, further comprising receiving the DRC message from each user in the plurality of users prior to step (a).

3. The method of claim 1, further comprising filtering the prior respective FL SINR values of each user prior to step (a).

4. The method of claim 1, wherein increasing the estimated FL SINR for all users comprises limiting the increase to a maximum increase limit.

5. The method of claim 1, wherein decreasing the estimated FL SINR for all users comprises limiting the decrease to a minimum decrease limit.

6. The method of claim 1, further comprising repeating steps (b) through (e) until the remaining control channel power is between the high and low thresholds.

7. The method of claim 1, further comprising:
    performing step (a) in a first time slot; and
    performing steps (b) through (e) in a second time slot subsequent to the first time slot.

8. The method of claim 1, wherein step (d) comprises increasing the estimated FL SINR for a first user by a larger amount than the increase amount for a second user, if the first user's DRC message is longer than the second user's DRC message.

9. The method of claim 1, wherein step (e) comprises decreasing the estimated FL SINR for a first user by a larger amount than the decrease amount for a second user, if the first user's DRC message is longer than the second user's DRC message.

10. An apparatus for adjusting a plurality of forward link (FL) signal to interference and noise ratio (SINR) estimates, comprising:
    a transceiver configured to support a plurality of communication links with a respective plurality of user access terminals;
    a processor coupled to the transceiver; and
    a memory coupled to the processor and comprising executable code to cause the processor to:
    (a) estimate a FL SINR for each user in a plurality of users, based on at least one of each user's respective data rate control (DRC) message or each users respective prior FL SINR value;
    (b) increase the respective estimated FL SINR for a user in the plurality of users, if, based on a reverse link acknowledge message, the user has decoded an early-terminating packet at a decoding bit rate higher than a data rate associated with the user's respective DRC;
    (c) determine control channel power remaining after step (b);
    (d) increase the estimated FL SINR for all users in the plurality of users if the remaining control channel power is less than a low threshold; and
    (e) decrease the estimated FL SINR for all users in the plurality of users if the remaining control channel power is greater than a high threshold.

11. The apparatus of claim 10, wherein the memory further comprises executable code to cause the processor to receive the DRC message from each user in the plurality of users prior to step (a).

12. The apparatus of claim 10, wherein the memory further comprises executable code to cause the processor to filter the prior respective FL SINR values of each user prior to step (a).

13. The apparatus of claim 10, wherein the memory further comprises executable code to cause the processor to limit the increase of the estimated FL SINR for all users to a maximum increase limit.

14. The apparatus of claim 10, wherein the memory further comprises executable code to cause the processor to limit the decrease of the estimated FL SINR for all users to a minimum decrease limit.

15. The apparatus of claim 10, wherein the memory further comprises executable code to cause the processor to repeat steps (b) through (e) until the remaining control channel power is between the high and low thresholds.

16. The apparatus of claim 10, wherein the memory further comprises executable code to cause the processor to
    perform step (a) in a first time slot; and
    perform steps (b) through (e) in a second time slot, subsequent to the first time slot.

17. The apparatus of claim 10, wherein the memory further comprises executable code to cause the processor to, in step (d), increase the estimated FL SINR for a first user by a larger amount than the increase amount for a second user, if the first users DRC message is longer than the second users DRC message.

18. The apparatus of claim 10, wherein the memory further comprises executable code to cause the processor to, in step (e), decreasing the estimated FL SINR for a first user by a larger amount than the decrease amount for a second user, if the first user's DRC message is longer than the second user's DRC message.

19. An apparatus for adjusting a plurality of forward link (FL) signal to interference and noise ratio (SINR) estimates, comprising:

means for estimating a FL SINR for each user in a plurality of users, based on at least one of each user's respective data rate control (DRC) message or each user's respective prior FL SINR value;

means for increasing the respective estimated FL SINR for a user in the plurality of users, if, based on a reverse link acknowledge message, the user has decoded an early-terminating packet at a decoding bit rate higher than a data rate associated with the user's respective DRC;

means for determining control channel power;

means for increasing the estimated FL SINR for all users in the plurality of users if the remaining control channel power is less than a low threshold; and means for decreasing the estimated FL SINR for all users in the plurality of users if the remaining control channel power is greater than a high threshold.

20. The apparatus of claim 19, further comprising means for receiving the DRC message from each user in the plurality of users prior to estimating the FL SINR for each user.

21. The apparatus of claim 19, further comprising means for filtering the prior respective FL SINR values of each user prior to estimating the FL SINR for each user.

22. The apparatus of claim 19, wherein the means for increasing the estimated FL SINR for all users comprises means for limiting the increase to a maximum increase limit.

23. The apparatus of claim 19, wherein the means for decreasing the estimated FL SINR for all users comprises means for limiting the decrease to a minimum decrease limit.

24. The apparatus of claim 19, further comprising means for repeating, until the remaining control channel power is between the high and low thresholds, the increasing the respective estimated FL SINR for a user in the plurality of users, it based on a reverse link acknowledge message, the user has decoded a packet before all symbols in the packet have been transmitted; the determining control channel power; the increasing the estimated FL SINR for all users in the plurality of users if the remaining control channel power is less than a low threshold; and the decreasing the estimated FL SINR for all users in the plurality of users if the remaining control channel power is greater than a high threshold.

25. The apparatus of claim 19, wherein the means for estimating the FL SINR further comprises means for performing the estimation in a first time slot; and the means for increasing the respective estimated FL SINR for a user in the plurality of users comprises means for performing the increasing in a second time slot subsequent to the first time slot.

26. The apparatus of claim 19, wherein the means for increasing, the estimated FL SINR for all users in the plurality of users comprises means for increasing the estimated FL SINR for a first user by a larger amount than the increase amount for a second user, if the first user's DRC message is longer than the second user's DRC message.

27. The apparatus of claim 19, wherein the means for decreasing the estimated FL SINR for all users in the plurality of users comprises means for decreasing the estimated FL SINR for a first user by a larger amount than the decrease amount for a second user, if the first user's DRC message is longer than the second users DRC message.

28. A non-transitory processor-readable medium, comprising instructions that, if executed by a processor, cause the processor to:

(a) estimate a FL SINR for each user in a plurality of users, based on at least one of each user's respective data rate control (DRC) message or each user's respective prior FL SINR value;

(b) increase the respective estimated FL SINR for a user in the plurality of users, if, based on a reverse link acknowledge message, the user has decoded an early-terminating packet at a decoding bit rate higher than a data rate associated with the user's respective DRC;

(c) determine control channel power remaining after step (b);

(d) increase the estimated FL SINR for all users in the plurality of users if the remaining control channel power is less than a low threshold; and (e) decrease the estimated FL SINR for all users in the plurality of users if the remaining control channel power is greater than a high threshold.

29. The non-transitory processor-readable medium of claim 28, wherein the instructions include further instructions that, if executed by the processor, cause the processor to receive the DRC message from each user in the plurality of users prior to step (a).

30. The non-transitory processor-readable medium of claim 28, wherein the instructions include further instructions that, if executed by the processor, cause the processor to filter the prior respective FL SINR values of each user prior to step (a).

31. The non-transitory processor-readable medium of claim 28, wherein the instructions include further instructions that, if executed by the processor, cause the processor to limit the increase of the estimated FL SINR for all users to a maximum increase limit.

32. The non-transitory processor-readable medium of claim 28, wherein the instructions include further instructions that, if executed by the processor, cause the processor to limit the decrease of the estimated FL SINR for all users to a minimum decrease limit.

33. The non-transitory processor-readable medium of claim 28, wherein the instructions include further instructions that if executed by the processor, cause the processor to repeat steps (b) through (e) until the remaining control channel power is between the high and low thresholds.

34. The non-transitory processor-readable medium of claim 28, wherein the instructions include further instructions that, if executed by the processor, cause the processor to:
perform step (a) in a first time slot; and
perform steps (b) through (e) in a second time slot subsequent to the first time slot.

35. The non-transitory processor-readable medium of claim 28, wherein the instructions include further instructions that, if executed by the processor, cause the processor to increase the estimated FL SINR for a first user by a larger amount than the increase amount for a second user, if the first user's DRC message is longer than the second user's DRC message.

36. The non-transitory processor-readable medium of claim 28, wherein the instructions include further instructions that, if executed by the processor, cause the processor to decrease the estimated FL SINR for a first user by a larger amount than the decrease amount for a second user, if the first user's DRC message is longer than the second user's DRC message.

37. The apparatus of claim 10, wherein the transceiver is part of an access point.

38. The apparatus of claim 19, wherein the means for increasing the respective estimated FL SINR for the user in the plurality of users is part of an access point.

\* \* \* \* \*